US012583119B2

(12) United States Patent (10) Patent No.: US 12,583,119 B2
Taruno (45) Date of Patent: Mar. 24, 2026

(54) TRANSFER SYSTEM AND TRANSFER METHOD

(71) Applicant: KABUSHIKI KAISHA YASKAWA DENKI, Fukuoka (JP)

(72) Inventor: Makoto Taruno, Fukuoka (JP)

(73) Assignee: KABUSHIKI KAISHA YASAKAWA DENKI, Fukuoka (JP)

( * ) Notice: Subject to any disclaimer, the term of this patent is extended or adjusted under 35 U.S.C. 154(b) by 258 days.

(21) Appl. No.: 18/371,821

(22) Filed: Sep. 22, 2023

(65) Prior Publication Data

US 2024/0109197 A1 Apr. 4, 2024

(30) Foreign Application Priority Data

Sep. 30, 2022 (JP) ................................. 2022-158432

(51) Int. Cl.
*B25J 9/16* (2006.01)
*B25J 11/00* (2006.01)
*B25J 13/08* (2006.01)

(52) U.S. Cl.
CPC ........... *B25J 9/1687* (2013.01); *B25J 9/1638* (2013.01); *B25J 11/0095* (2013.01); *B25J 13/081* (2013.01); *B25J 13/088* (2013.01)

(58) Field of Classification Search
None
See application file for complete search history.

(56) References Cited

U.S. PATENT DOCUMENTS

| 2003/0173316 | A1* | 9/2003 | Park | ..................... | H01L 21/6734 |
| | | | | | 211/41.18 |
| 2007/0071581 | A1* | 3/2007 | Gilchrist | ........... | H01L 21/67265 |
| | | | | | 414/217 |
| 2015/0219439 | A1* | 8/2015 | Kondoh | ............ | H01L 21/67766 |
| | | | | | 356/614 |
| 2016/0133502 | A1* | 5/2016 | Won | ........................ | B25J 9/1679 |
| | | | | | 901/46 |
| 2017/0018446 | A1* | 1/2017 | Yin | .................... | H01L 21/68707 |
| 2017/0190053 | A1* | 7/2017 | Xu | .......................... | B25J 9/1664 |
| 2019/0181027 | A1* | 6/2019 | Yoshida | ............ | H01L 21/67259 |
| 2023/0321839 | A1* | 10/2023 | Shimizu | ............... | B25J 11/0095 |
| | | | | | 414/222.01 |
| 2024/0058952 | A1* | 2/2024 | Imanishi | .............. | B25J 11/0095 |

FOREIGN PATENT DOCUMENTS

| JP | 2002076108 A | * | 3/2002 |
| JP | 2007-234936 A | | 9/2007 |
| JP | 2021-167044 A | | 10/2021 |

* cited by examiner

*Primary Examiner* — Adam R Mott
*Assistant Examiner* — Alan Lindsay Ostrow
(74) *Attorney, Agent, or Firm* — Venjuris, P.C.

(57) ABSTRACT

A transfer system includes a robot and a controller that controls an operation of the robot. The robot includes a hand that transfers a substrate, and a lift mechanism that moves up and down the hand. The hand includes a sensor that detects a distance to a lower surface of the substrate. The controller includes a storage unit, a detection unit, and a calculation unit. The storage unit stores placement information including a placement height at a placement position of the substrate. The detection unit detects a separation height at which the substrate is separated from the hand when the hand is moved down from the placement height. The calculation unit calculates a deflection amount of the substrate based on a difference between the placement height and the separation height.

14 Claims, 10 Drawing Sheets

| SUBSTRATE IDENTIFICATION NUMBER | MANUFACTURING PROCESS NUMBER | DEFLECTION AMOUNT |
|---|---|---|
| 1 | 5 | 2 |
| ⋮ | ⋮ | ⋮ |
| 11 | 2 | 4 |
| ⋮ | ⋮ | ⋮ |
| 41 | 1 | 6 |
| ⋮ | ⋮ | ⋮ |

TRANSFER SYSTEM AND TRANSFER METHOD

CROSS-REFERENCE TO RELATED APPLICATIONS

This application is based on and claims priority from Japanese Patent Application No. 2022-158432 filed on Sep. 30, 2022 with the Japan Patent Office, the disclosure of which is incorporated herein in its entirety by reference.

TECHNICAL FIELD

The present disclosure relates to a transfer system and a transfer method.

BACKGROUND

In the related art, a transfer system has been known, which uses a robot with a hand to transfer substrates such as wafers and panels to and from a cassette that holds the substrates.

For example, a technique has been proposed, which detects the possibility of contact between a robot and a wafer accommodated in a cassette by a wafer transfer arm or a cassette sensor (see, e.g., Japanese Patent Laid-Open Publication No. 2007-234936).

SUMMARY

In the related art described above, when the substrates accommodated in the cassette are deflected (bent or warped), there is a possibility that the accommodated substrates come into contact with the robot or new substrates to be loaded.

An aspect of an embodiment is to provide a transfer system and a transfer method capable of preventing substrates from being damaged due to contact even when the substrates are deflected.

According to an aspect, a transfer system includes a robot and a controller that controls an operation of the robot. The robot includes a hand that transfers a substrate, and a lift mechanism that moves up and down the hand. The hand includes a sensor that detects a distance to a lower surface of the substrate. The controller includes a storage unit, a detection unit, and a calculation unit. The storage unit stores placement information including a placement height at a placement position of the substrate. The detection unit detects a separation height at which the substrate is separated from the hand when the hand is moved down from the placement height. The calculation unit calculates a deflection amount of the substrate based on a difference between the placement height and the separation height.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 9 is an explanatory diagram of deflection amount information.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made without departing from the spirit or scope of the subject matter presented here.

Hereinafter, a transfer robot and a robot system of the present disclosure will be described in detail with reference to the drawings. The present disclosure is not limited to the embodiments described herein below.

Further, in the embodiments described herein below, expressions such as "parallel," "front," "straight," and "intermediate" may be used, but these conditions may not be strictly satisfied. That is, the expressions may allow deviations in, for example, manufacturing accuracy, installation accuracy, processing accuracy, and detection accuracy.

Figure 1:
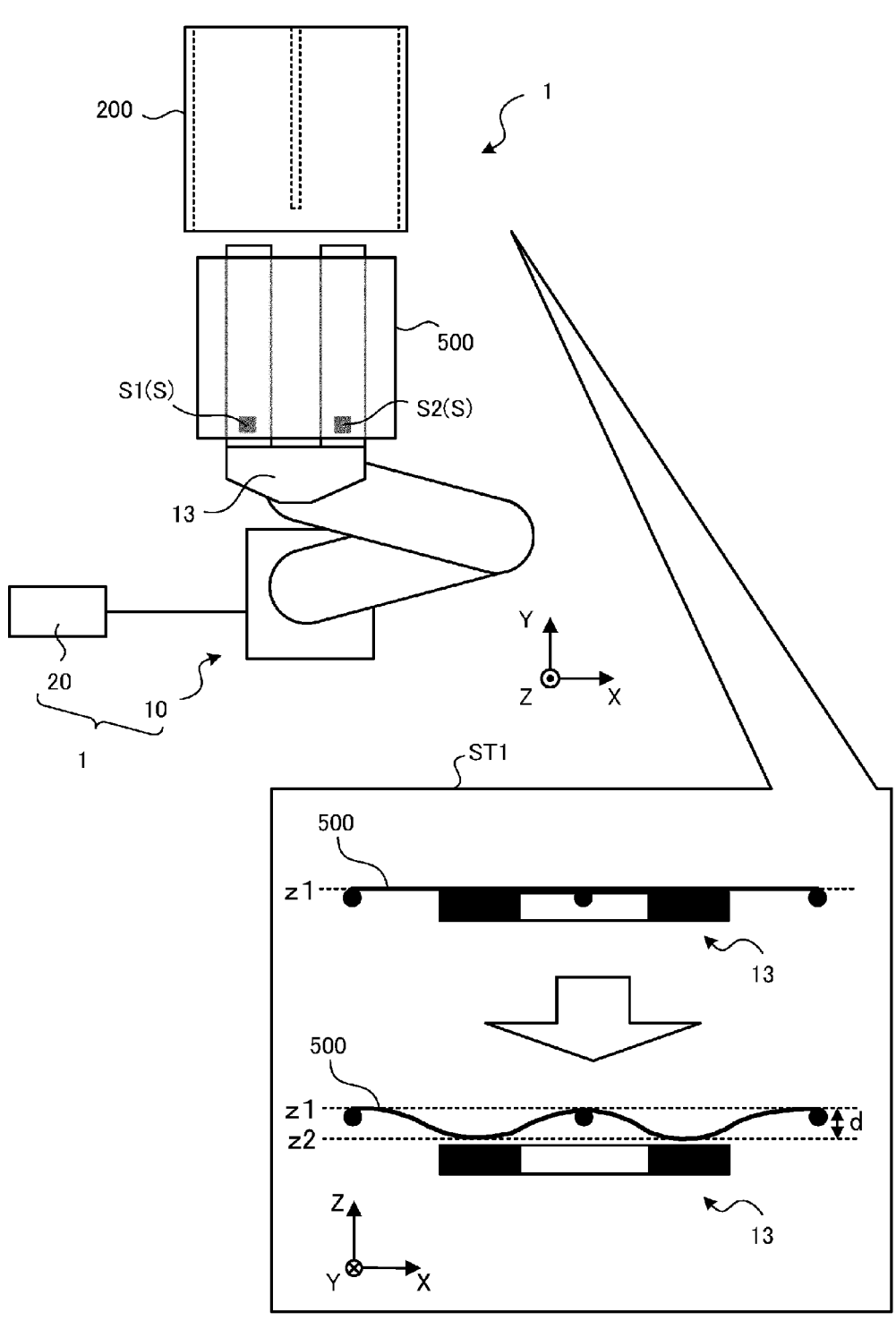
FIG. 1 is a schematic top view illustrating the outline of a transfer system.

First, an outline of a transfer system 1 according to an embodiment will be described with reference to FIG. 1. FIG. 1 is a schematic top view illustrating the outline of the transfer system 1. To facilitate the understanding of the descriptions, FIG. 1 illustrates a three-dimensional orthogonal coordinate system with a Z axis having the vertical upward direction as a positive direction, an X axis in a width direction along the front side of a cassette 200 on which a substrate 500 is placed, and an Y axis in a depth direction of the cassette 500. Such an orthogonal coordinate system may also be illustrated in other drawings used in the following descriptions.

Here, the front side of the cassette 200 refers to a side of the cassette 200 having an opening into which the hand 13 is capable of being inserted. Further, the cassette 200 has a plurality of support portions extending in an insertion direction (Y-axis direction) of the hand 13 (see the dashed lines illustrated in the cassette 200). A configuration of the cassette 200 will be described later with reference to FIGS. 4A and 4B. Further, FIG. 1 illustrates a front view ST1 of the substrate 500 placed on the cassette 200 as seen from the front side (Y-axis negative direction side).

FIG. 1 illustrates the cassette 200 that accommodates substrates 500 in multiple stages as a placement location for the substrates 500. However, the placement location for the substrates 500 may be an aligner for aligning the orientation of the substrates 500 or a processing apparatus for processing the substrates 500. An example of arrangement of the aligner and the processing apparatus will be described later with reference to FIG. 7. Further, in this embodiment, the substrate 500 is a panel such as a substrate of resin material (e.g., glass epoxy) or a glass substrate having a rectangular outer shape, but the substrate 500 may be a wafer having a circular outer shape or a thin plate of any shape and any material.

As illustrated in FIG. 1, the transfer system 1 includes a robot 10 and a controller 20 that controls the operation of the robot 10. The robot 10 includes a hand 13 that transfers a substrate 500, and a lift mechanism that moves up and down the hand 13. Here, the hand 13 includes a sensor S capable of detecting a distance to a lower surface of the substrate 500. That is, the sensor S may detect the substrate 500 placed on the hand 13 and the substrate 500 above the hand 13.

FIG. 1 illustrates a case where the sensor S is provided at each branch of the hand 13 whose distal end side is branched into two (the number of the sensors S is two), but the number of the sensors may be one. Further, when the distal end side of the hand 13 is branched into three or more, the sensor S may be provided at each branched portion. That is, the hand 13 may be provided with the same number of sensors S as the number of branches.

The controller 20 stores placement information including a "placement height (Z coordinates)" at a placement position (XY coordinates) of the substrate 500, and when the hand 13 is moved down from the placement height, detects a "separation height (Z coordinate)" where the substrate 500 is separated from the hand 13. Then, the controller 20 calculates the deflection amount of the substrate 500 based on the difference between the placement height and the separation height. The details of the configuration of the controller 20 will be described later with reference to FIG. 8.

Specifically, as illustrated in the upper part of the front view ST1 in FIG. 1, while the hand 13 holds the substrate 500, the hand 13 inserted to load the substrate 500 into the slot of the cassette 200 indicating the storage stage. Here, it is assumed that the "placement height" in the slot of the cassette 200 is "z1." The placement height refers to the height of the upper surface of the support portion in each slot. The hand 13 is inserted into the cassette 200 at a position higher than the placement height, and moved down from the insertion height to place the substrate 500 at the placement height of each slot. Then, as illustrated in the lower part of the front view ST1, when the hand 13 is further moved down, the substrate 500 is deformed to be deflected, so that the substrate 500 separates from the hand 13 at a height "z2."

The height at which the substrate separates from the hand 13 is called a "separation height," and the "separation height" is assumed to be "z2." Here, the separation height is measured by the sensor S in the hand 13. The front view ST1 illustrates a case where the "deflection amount" of the substrate 500 is "d." In this case, the deflection amount (d) may be expressed by the formula (d=z1−z2).

Thus, the separation height of the substrate 500 separated from the hand 13 is detected by moving down the hand 13 from the placement height of the substrate 500, and the deflection amount of the substrate 500 is calculated by the difference between the placement height and the detected separation height. Therefore, the controller 20 may acquire the deflection amount of the substrate 500. In this way, for example, it is possible to adjust the loading height of a new substrate 500 or stop loading the new substrate 500 in order to avoid contact with the substrate 500 that has been loaded.

Therefore, according to the transfer system 1 illustrated in FIG. 1, even when the substrate 500 is deflected, it is possible to prevent damage to the substrate 500 due to contact between the substrate 500 that has been loaded and the hand 13 or the substrate 500 held by the hand 13. Since the deflection amount tends to increase as the thickness of the substrate 500 becomes thinner, the acquisition of the deflection amount described above is particularly useful when the thickness of the substrate 500 is thin relative to the area of the main surface of the substrate 500.

Further, FIG. 1 illustrates the cassette 200 that accommodates substrates 500 in multiple stages, but the deflection amount acquisition procedure illustrated in FIG. 1 may also be applied to a placement location where one substrate 500 is placed. For example, the deflection amount may be acquired when the substrate is loaded into an aligner that aligns the orientation of the substrate, and when the substrate 500 is unloaded from the aligner, the hand 13, which is adjusted to a height corresponding to the acquired deflection amount, may access and unload the substrate 500. Thus, it is possible to avoid contact between the hand 13 and the substrate 500 to be unloaded.

Figure 2:
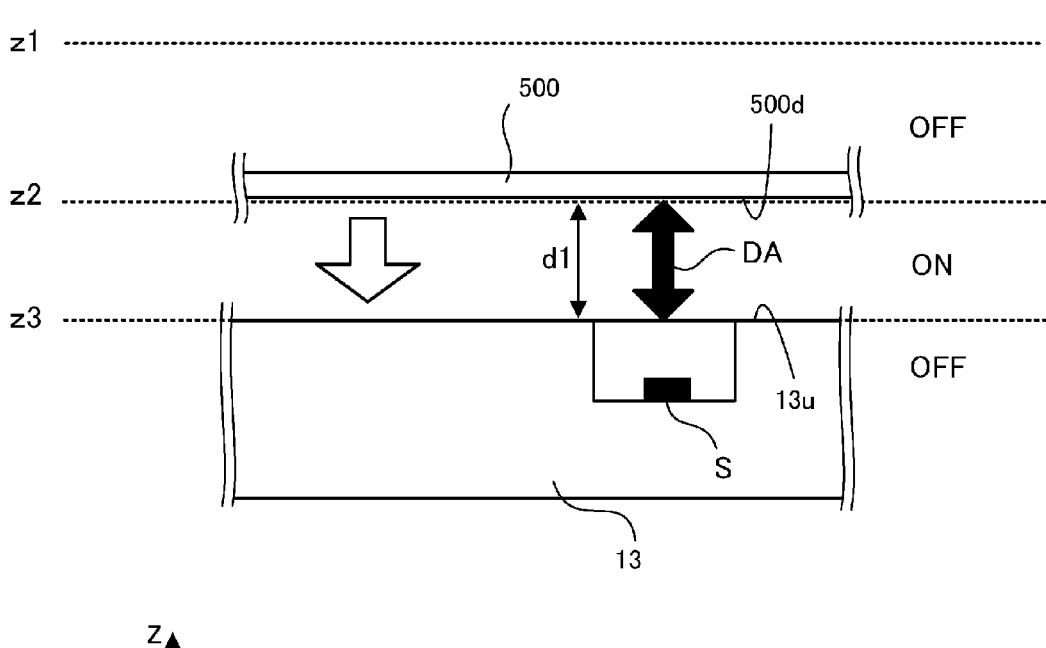
FIG. 2 is a schematic side view illustrating a detection range of a sensor.

Next, the sensor S illustrated in FIG. 1 will be described with reference to FIG. 2. FIG. 2 is a schematic side view illustrating a detection range of the sensor S. To facilitate the understanding of the descriptions, illustration of deformation due to deflection is omitted in the substrate 500 illustrated in FIG. 2. Further, the heights (z1 and z2) illustrated in FIG. 2 correspond to the placement height (z1) and the separation height (z2) illustrated in the front view ST1 of FIG. 1, respectively. Further, the height (z3) indicates a position lower than the separation height (z2).

As illustrated in FIG. 2, the sensor S is provided at a position lower than an upper surface 13u of the hand 13. Here, the sensor S is a limited reflection type fiber sensor with a limited detection range DA above. As the sensor S, a laser displacement sensor or a capacitance sensor may be used.

In the case illustrated in FIG. 2, the sensor S may detect an object within a range from the height (z3) corresponding to the upper surface 13u of the hand 13 to the separation height (z2). That is, the sensor S outputs an "ON" signal in the range from the height (z3) to the separation height (z2), and an "OFF" signal in a range closer than the height (z3) and farther than the separation height (z2). The height of the upper surface 13u of the hand 13 includes a surface height of, for example, a pad that supports the substrate 500 while preventing the substrate 500 from moving laterally.

Thus, the sensor S may detect the substrate 500 when a lower surface 500d of the substrate 500 is within the range from the height (z3) to the separation height (z2). That is, since the sensor S may detect when the lower surface 500d of the substrate 500 is on the upper surface 13u of the hand 13, the sensor S may also play a role of a so-called presence sensor (substrate presence sensor) that detects whether the substrate 500 is placed on the hand 13. Therefore, by using the sensor S, the number of sensors mounted on the hand 13 may be reduced.

Here, descriptions will be made on a fact that the detection of the separation height (z2) illustrated in the front view ST1 of FIG. 1 is performed only when the substrate 500 and the hand 13 are separated from each other by a predetermined distance. As illustrated in FIG. 2, when the distance along the Z-axis of the detection range DA of sensor S is "d1," the output signal of sensor S becomes "OFF" only when the upper surface 13u of hand 13 and the lower surface 500d of substrate 500 are separated by "d1." Therefore, the separation height (z2) may be expressed by the formula (z2=z3+d1). Thus, the separation height (z2) illustrated in the front view ST1 of FIG. 1 may be calculated.

Figure 3:
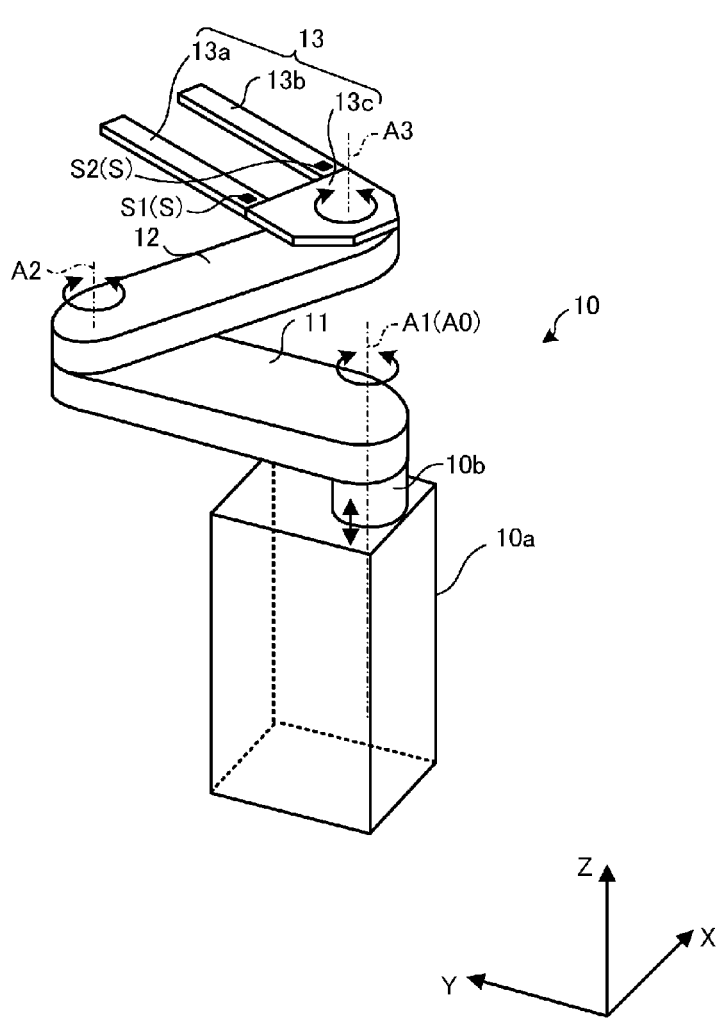
FIG. 3 is a perspective view of a robot.

Next, a configuration example of the robot 10 illustrated in FIG. 1 will be described with reference to FIG. 3. FIG. 3 is a perspective view of the robot 10. FIG. 3 corresponds to a perspective view of the robot 10 as viewed obliquely from above.

As illustrated in FIG. 3, the robot 10 is, for example, a horizontally articulated robot having a horizontally articulated SCARA arm and a lift mechanism. The robot 10 includes a body portion 10*a*, a lift portion 10*b*, a first arm 11, a second arm 12, and a hand 13. The body portion 10*a* is fixed to, for example, a bottom surface of the transfer chamber, and incorporates a lift mechanism for moving up and down the lift portion 10*b*.

The lift portion 10*b* supports the proximal end side of the first arm 11 so as to be rotatable around a first axis A1, and moves up along a lift axis A0. The lift portion 10*b* itself may be rotated around the first axis A1. Alternatively, the first axis A1 may be positioned closer to the Y-axis negative direction on the upper surface of the lift portion 10*b*. The first arm 11 may be made longer by positioning the first axis A1 closer to the Y-axis negative direction in the same drawing.

The first arm 11 supports the proximal end side of the second arm 12 on the distal end side so as to be rotatable around the second axis A2. The second arm 12 supports the proximal end side of the hand 13 on the distal end side so as to be rotatable around the third axis A3.

Thus, the robot 10 is a horizontally articulated robot including three links of the first arm 11, the second arm 12, and the hand 13. Further, since the robot 10 has a lift mechanism as described above, the robot 10 may access each of the substrates 500 accommodated in multiple stages in the cassette 200 and acquire the presence or absence of each of the accommodated substrates 500 by the operation of moving down the hand 13.

The hand 13 includes a first extending portion 13*a*, a second extending portion 13*b*, and a base portion 13*c*. The first extending portion 13*a* and the second extending portion 13*b* are branched from the base portion 13*c* and extend to face each other with a gap therebetween. Further, a sensor S1 and a sensor S2 are provided on the proximal end sides (base 13*c* side) of the upper surfaces of the first extending portion 13*a* and the second extending portion 13*b*, respectively. Further, the substrate 500 illustrated in FIG. 1 is supported from below by the first extending portion 13*a* and the second extending portion 13*b*. The positional relationship between the sensors S1 and S2 will be described later with reference to FIG. 4B.

Figure 4A:
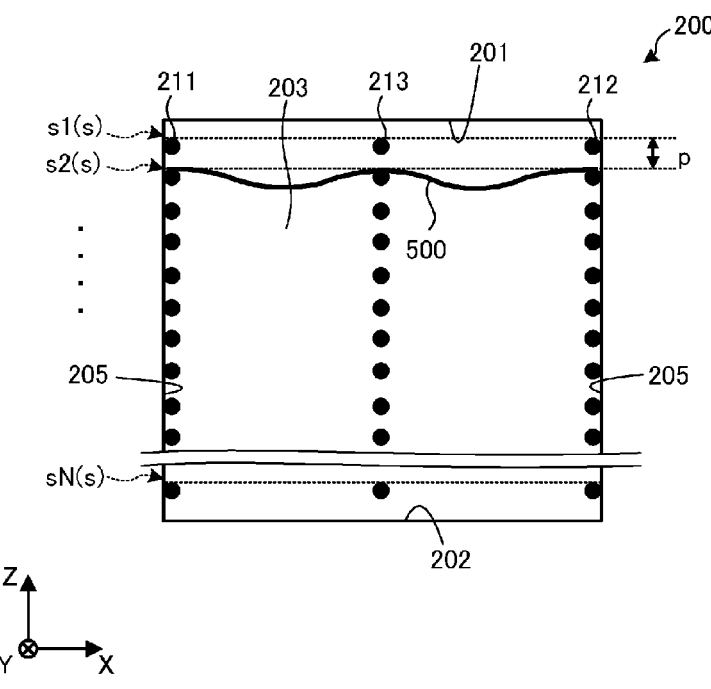
FIG. 4A is a schematic front view of a cassette.
Figure 4B:
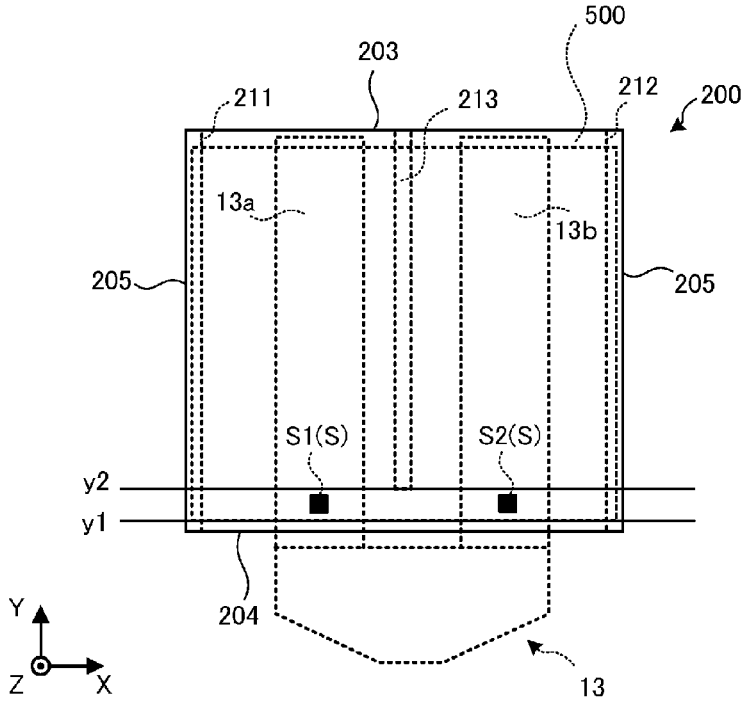
FIG. 4B is a schematic top view of the cassette.

Next, the cassette 200 illustrated in FIG. 1 will be described with reference to FIGS. 4A and 4B. FIG. 4A is a schematic front view of the cassette 200, and FIG. 4B is a schematic top view of the cassette 200. In FIG. 4B, the hand 13 at a delivery position of the substrate 500 in the cassette 200 is indicated by a broken line.

As illustrated in FIG. 4A, the front side of the cassette 200 is open, and N-stage slots (N is a natural number greater than or equal to 2) are provided between top surface 201 and a bottom surface 202 inside the cassette 200, each of which may accommodate a substrate 500. Each slot is provided with a first support portion 211, a second support portion 212, and a third support portion 213 extending in a direction along the depth of the cassette 200 (Y-axis direction).

Here, each slot supports the substrate 500 at a placement height (s). When distinguishing the placement height of each stage, the height of the first stage is expressed as a placement height (s1), the height of the second stage is expressed as a placement height (s2), and the height of the Nth stage is expressed as a placement height (sN). In addition, it is assumed that a pitch (p) between slots is equal.

The first support portion 211 and the second support portion 212 are provided on the lateral side 205 inside the cassette 200. Further, the third support portion 213 is provided at an intermediate position between the first support portion 211 and the second support portion 212 in the width direction (X-axis direction) of the cassette 200. That is, the cassette 200 supports the substrate 500 at three points when viewed from the front side. Although FIG. 4A illustrates a case where there is one third support portion 213, for example, two or more third support portions 213 may be provided such that the intervals between the support portions are equal.

Here, as illustrated in FIG. 4B, the third support portion 213 is a rod-shaped (bar-shaped) member extending from a rear side 203 of the cassette 200 toward the front side 204 of the cassette 200, and its front end is closer to the rear side 203 of the cassette 200 than front ends of the support portion 211 and the second support portion 212. That is, the extension length of the third support portion 213 in the depth direction (Y-axis direction) is shorter than the extension lengths of the first support portion 211 and the second support portion 212.

As described above, when the front end of the third support portion 213 is short, the front side of the substrate 500 supported by the third support portion 213 may droop forward. Here, the sensor S is located on the proximal end side of each extending portion of the hand 13. Therefore, it is easy for the sensor S to detect the deflection amount that takes into account the influence of the forward drooping. In this embodiment, descriptions will be made on a case where the sensor S is provided on the proximal end side of each extending portion of the hand 13, but the sensor S may be provided on the distal end side of each extending portion.

Further, as illustrated in FIG. 4B, the hand 13 includes a first extending portion 13*a* that is insertable between the first support portion 211 and the third support portion 213, and a second extending portion 13*b* that is insertable between the second support portion 212 and the third support portion 213. As described above, when two or more third support portions 213 are provided, the hand 13 may be provided with the number of extending portions that are insertable between the respective support portions.

As described above, the cassette 200 includes the first support portion 211 and the second support portion 212 that support both ends of the substrate 500, respectively, when viewed from the front side of the cassette 200. Further, the cassette 200 includes the third support portion 213 that supports the substrate 500 at an intermediate position between the first support portion 211 and the second support portion 212.

Further, the hand 13 includes at least a first extending portion 13*a* that is insertable between the first support portion 211 and the third support portion 213, and a second extending portion 13*b* that is insertable between the second support portion 212 and the third support portion 213. The sensors S are provided on the proximal end sides of the first extending portion 13*a* and the second extending portion 13*b* of the hand 13, respectively. That is, by providing the sensor S on the proximal end side of the hand 13 as a whole, deterioration of the detection accuracy of the sensor S due to the vibration of the hand 13 may be reduced.

Thus, by combining the cassette 200 that supports the substrate at three points when viewed from the front and the bifurcated hand 13, it is easier to detect the easily deflected portions of the substrate 500 with the sensors S at the two extending portions of the hand 13. Further, by providing the sensor S on the proximal end side of each extending portion of the hand 13, deterioration of the detection accuracy due to vibration of each extending portion may be reduced, compared to the case where the sensor S is provided on the distal end side of each extending portion.

Further, as illustrated in FIG. 4B, the sensors S (sensor S1 and sensor S2) are positioned between the front end (y2) of the third support portion 213 and the front end (y1) of the substrate 500 in the top view when the hand 13 is at the transfer position of the substrate 500 inside the cassette 200. Thus, by setting the placement positions of the sensors S on the hand 13 in the depth direction (Y-axis direction) of the cassette 200 to be within the range described above, the influence of the substrate 500 drooping forward due to the short third support portion 213 may be easily detected by the sensors S.

Figure 5:
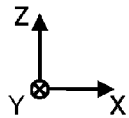
FIG. 5 is an explanatory diagram of a determination processing regarding whether a substrate is able to be loaded.

Next, referring to FIG. 5, descriptions will be made on a determination process regarding whether the substrate 500 is capable of being loaded based on the detected deflection amount. FIG. 5 is an explanatory diagram of a determination process regarding whether the substrate 500 is capable of being loaded. FIG. 5 illustrates three phases (phase S51, phase S52 and phase S53) of process flow of loading the substrate 500 into the first stage (uppermost stage) of the cassette 200, detecting the deflection amount, and determining whether a new substrate 500 is capable of being loaded into the second stage of the cassette 200.

As illustrated in phase S51 of FIG. 5, the hand 13 holding the substrate 500 is advanced into the cassette 200 at a height higher than the placement height (s1) to place the substrate 500 at the placement height (s1) in the first slot in the cassette 200. FIG. 5 illustrates a case where the hand 13 is advanced at an advancing height (h1) that is higher than each placement height (s) by a margin (m).

The size of the margin (m) is determined in advance according to the thickness of the hand 13, the thickness of the substrate 500, and the vertical width of each support portion in the cassette 200. Although FIG. 5 illustrates the case where the margin (m) is the same for each stage of the cassette 200, the size may be different for each slot.

When the hand 13 illustrated in phase S51 is moved down, the substrate 500 is placed in the first-stage slot of the cassette 200 at the placement height (s1) as illustrated in phase S52. Further, as the hand 13 is moved down, the substrate 500 is deformed while being supported by the slot of the cassette 200 and the hand 13. Specifically, while the substrate 500 is supported by the hand 13, the substrate 500 is deflected and deformed in the portions between the first support portion 211 and the third support portion 213 and between the second support portion 212 and the third support portion 213 in the cassette 200 due to its own weight. Then, the hand 13 separated from the substrate 500 retreats out of the cassette 200.

In phase S52, the portion of the substrate 500 supported by the first extending portion 13a of the hand 13 has a deflection amount of "d2," and the portion of the substrate 500 supported by the second extending portion 13b of the hand 13 has a deflection amount of "d3." When the two deflection amounts are different, the relatively larger value is adopted as the deflection amount (d) of the substrate 500.

Subsequently, as illustrated in phase S53, the controller 20 illustrated in FIG. 1 determines whether the hand 13 holding a new substrate is capable of advancing into the cassette 200 at an advancing height (h2) in the second slot. That is, based on the deflection amount (d) of the substrate 500 placed in the first-stage slot, it is determined whether there is a safety interval between the bottom surface of the deflected substrate 500 that has been loaded and the top surface of the new substrate 500 held by the hand 13.

The size of the safety interval may be set in advance. Then, when it is determined that the safety interval is present, the controller 20 determines that the hand 13 is capable of advancing into the slot on the second stage. Meanwhile, when it is determined that the safety interval is absent, the controller 20 determines that the advance is not possible. In phase S53, the hand 13 planned to advance at the advancing height (h2) is illustrated for reference.

Meanwhile, when the controller 20 determines that the advance is not possible, an error message is displayed to stop the advance of the hand 13 into the second slot. A new substrate 500 may be loaded into the third-stage slot, which is directly below the second-stage slot. Phase S53 illustrates an example in which the hand 13 is capable of advancing at the advancing height (h2).

Thus, the robot 10 illustrated in FIG. 1 loads the substrates 500 into the cassette 200 in an order from the upper stage to the lower stage. Further, the controller 20 determines whether a new substrate 500 is capable of being loaded into an immediately-below stage based on the deflection amount of the last substrate 500 loaded into the cassette 200. Then, when it is determined that loading is possible, a new substrate 500 is loaded into the immediately-below stage. Meanwhile, when it is determined that loading is impossible, a new substrate 500 is loaded into, for example, a stage immediately below the immediately-below stage.

By loading the substrates 500 into the cassette 200 in the order from top to bottom, the work of loading the substrates 500 may be performed quickly. Further, since the deflection amount of the substrate 500 loaded into an immediately-above stage is used to determine whether the substrate is capable of being loaded into the immediately-below stage, damage to the substrate 500 due to contact may be prevented.

Figure 6:
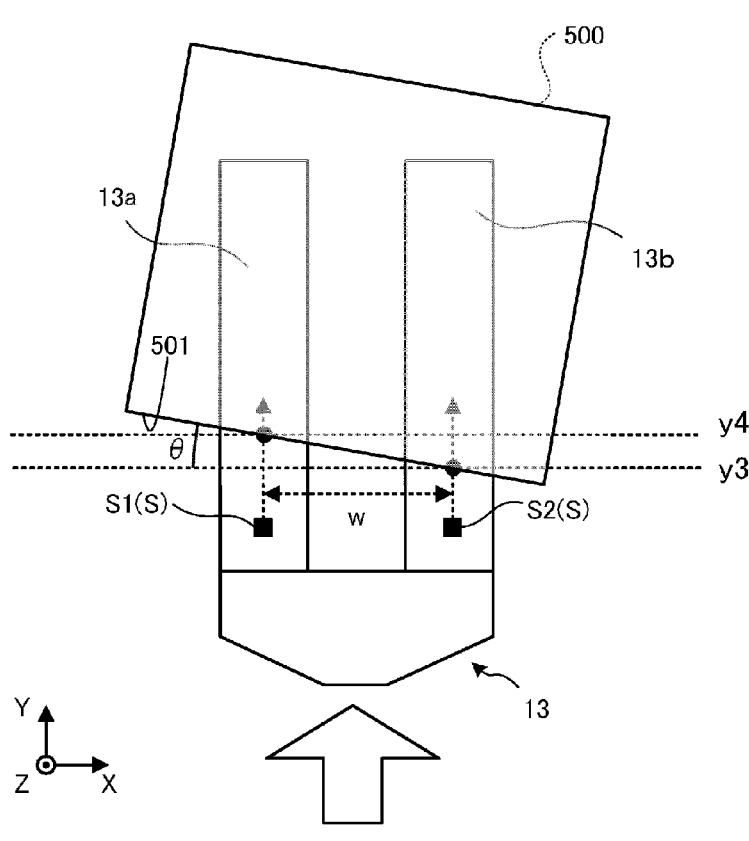
FIG. 6 is an explanatory diagram of a substrate orientation detection process.

Next, a substrate orientation detection process using the sensors S1 and S2 will be described with reference to FIG. 6. FIG. 6 is an explanatory diagram of a substrate orientation detection process. FIG. 6 omits the illustration of the cassette 200 illustrated in FIG. 5. Further, the deviation angle of the substrate orientation is exaggerated from the viewpoint of facilitating the understanding. Further, FIG. 6 illustrates a case where the extending direction of the hand 13 is along the Y-axis direction.

Descriptions will be made on a case of moving the hand 13 in the Y-axis positive direction as illustrated in FIG. 6. Here, when the extending direction of the hand 13 and the direction of the substrate are relatively deviated, the sensor S1 and the sensor S2, which are arranged such that the coordinates of the Y-axis are the same, have a deviation in the detection timing of a side 501 of the substrate 500 closer to the hand 13.

As illustrated in FIG. 6, when the hand 13 is moved in the Y-axis positive direction so as to pass under the substrate 500, the sensor S2 detects the side 501 of the substrate at a coordinate (y3). Meanwhile, the sensor S1 detects the side 501 at a coordinate (y4) larger than the coordinate (y3). Here, assuming that the distance between the sensor S1 and the sensor S2 is "w," the relative deviation angle (0) is represented by the formula ($\theta = \arctan((y4 - y3)/w)$).

Thus, the controller 20 illustrated in FIG. 1 causes the sensors S (sensor S1 and sensor S2) provided on the proximal end side of the first extending portion 13a and the second extending portion 13b, respectively, to detect the side 501 of the substrate 500, thereby detecting the orientation of the substrate 500 to be transferred with respect to the hand 13.

Then, when it is detected that the orientation of the hand 13 and the orientation of the substrate 500 are relatively deviated, the substrate 500 may be held straight in the hand 13 by moving the hand 13 toward the substrate 500 again at an angle corrected for the deviation angle (θ). In the case illustrated in FIG. 6, after rotating the hand 13 clockwise by "θ," the hand 13 may be moved toward the center of the side 501 of the substrate 500.

Figure 7:
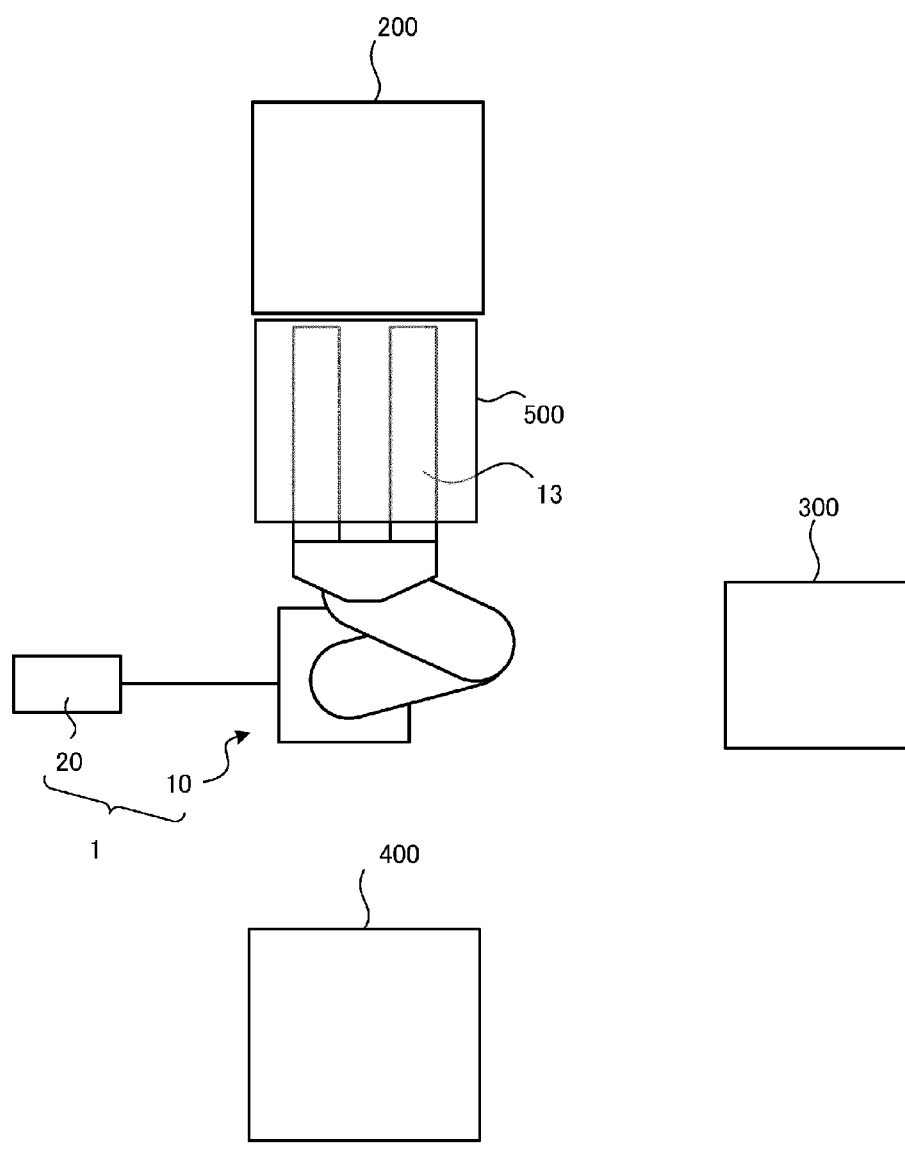
FIG. 7 is a top view of a transfer chamber.
Figure 7:
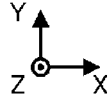

Next, referring to FIG. 7, descriptions will be made on an arrangement example of each device in a transfer chamber in which the transfer system 1 illustrated in FIG. 1 is installed. FIG. 7 is a top view of a transfer chamber. As illustrated in FIG. 7, the transfer system 1 including the robot 10 and the controller 20, the cassette 200, an aligner 300, and a processing apparatus 400 are arranged in the transfer chamber.

Here, the transfer chamber is an area surrounded by a housing (not illustrated), and is provided so as to form a clean airflow from the top to the bottom. Further, the aligner 300 has a placing table connected to a rotary shaft that rotates about the vertical Z-axis to align the substrate 500. Further, the processing apparatus 400 is an apparatus that performs various processing treatments on the substrate 500 for each manufacturing process of the substrate 500.

At least the cassette 200 and the aligner 300 are installed within a range accessible by the robot 10. In the embodiment, the robot 10 transfers the substrate 500 from the cassette 200 to the aligner 300, and the substrate 500 is transferred from the aligner 300 to the post-processing apparatus 400 using, for example, another transfer device. As illustrated in FIG. 7, the processing apparatus 400 may be installed within an accessible range of the robot 10, and the robot 10 may transfer the substrate 500 from the aligner 300 to the processing apparatus 400. In FIG. 7, one cassette 200, one aligner 300, and one processing unit 400 are illustrated, but the number of each device is not limited. That is, two or more devices may be arranged.

As described above, the transfer system 1 detects the deflection amount of the substrates 500 placed on the cassette 200, but the same procedure may also be used to detect the deflection amount of the substrates 500 placed on the aligner 300 or the substrates 500 placed on the processing apparatus 400.

Figure 8:
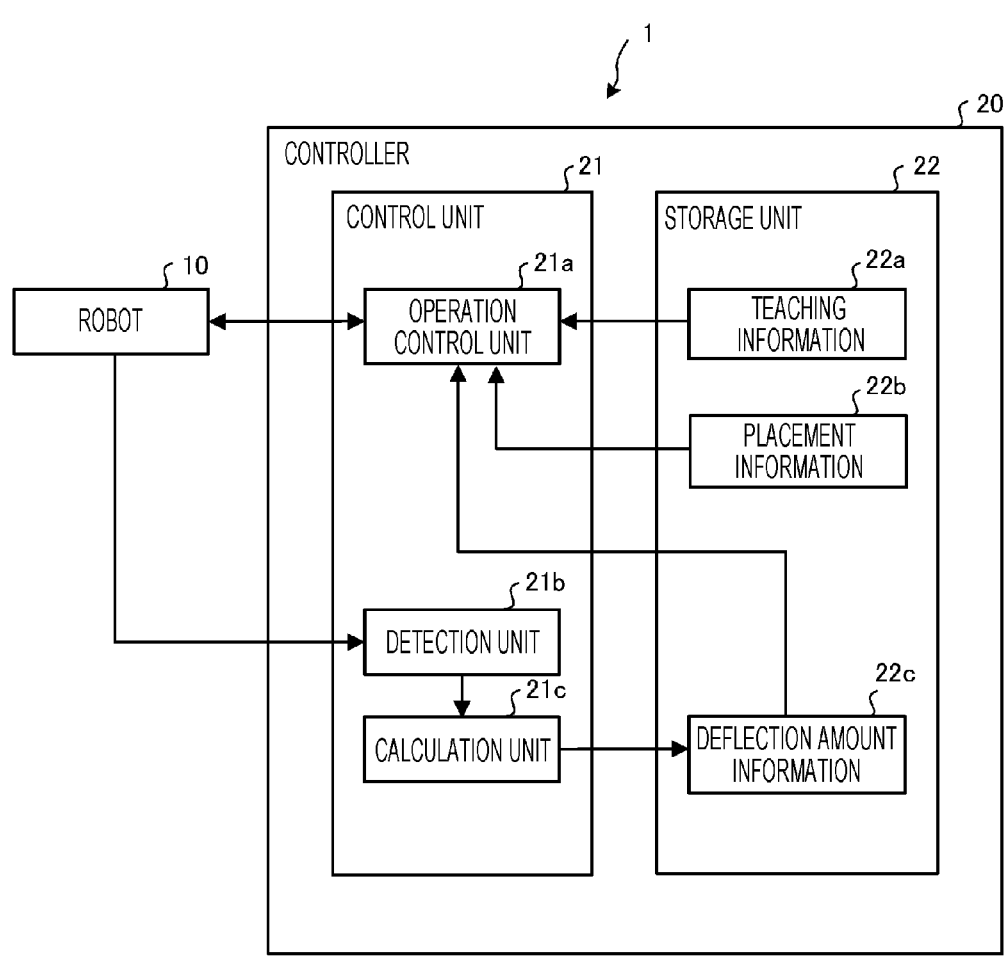
FIG. 8 is a block diagram of the transfer system.

Next, a configuration example of the transfer system 1 illustrated in FIG. 1 will be described with reference to FIG. 8. FIG. 8 is a block diagram of the transfer system 1. The transfer system 1 includes the robot 10 and the controller 20 that controls the operation of the robot 10. Since the configuration example of the robot 10 has already been described with reference to FIG. 3, the configuration of the controller 20 will be mainly described below.

As illustrated in FIG. 8, the controller 20 includes a control unit 21 and a storage unit 22. The control unit 21 includes an operation control unit 21*a*, a detection unit 21*b*, and a calculation unit 21*c*. The storage unit 22 also stores teaching information 22*a*, placement information 22*b*, and deflection amount information 22*c*. Further, the controller 20 is connected to the robot 10.

Here, the controller 20 includes, for example, a computer having a central processing unit (CPU), a read only memory (ROM), a random access memory (RAM), a hard disk drive (HDD), an input/output port, or various circuits. The CPU of the computer functions as the operation control unit 21*a*, the detection unit 21*b*, and the calculation unit 21*c* of the control unit 21 by reading and executing, for example, programs stored in the ROM. Further, at least one or all of the operation control unit 21*a*, the detection unit

21*b*, and calculation unit 21*c* of the control unit 21 may be configured by hardware such as an application specific integrated circuit (ASIC) or a field programmable gate array (FPGA).

The storage unit 22 corresponds to, for example, a RAM or an HDD. The RAM and HDD may store the teaching information 22*a*, the placement information 22*b*, and the deflection amount information 22*c*. Further, the controller 20 may acquire the programs described above or various kinds of information via another computer or a portable recording medium connected by a wired or wireless network.

The operation control unit 21*a* performs operation control of the robot 10 based on the teaching information 22*a*, the placement information 22*b*, and the deflection amount information 22*c*. Specifically, the operation control unit 21*a* instructs actuators corresponding to the axes of the robot 10 based on the teaching information 22*a* stored in the storage unit 22, thereby causing the robot 10 to transfer the substrate 500. Further, the operation control unit 21*a* performs a feedback control using encoder values of the actuators, thereby improving the operation accuracy of the robot 10.

Further, the operation control unit 21*a* places the substrate 500 at various placement positions based on the placement information 22*b* including the placement height at the placement position of the substrate 500. However, after the deflection amount of the substrate 500 is detected, the substrate 500 is transferred at the hand height obtained by correcting the placement information 22*b* with the deflection amount information 22*c* including the deflection amount.

For example, when the substrate 500 is deflected downward by a deflection amount (d), the substrate 500 is transferred to a height obtained by subtracting the deflection amount (d) from the placement height at each placement position. The deflection amount (d) may be a negative value. This is because the substrate 500 may be deflected upward.

The detection unit 21*b* detects the separation height at which the substrate 500 is separated from the hand 13 when the hand 13 is moved down from the placement height at each placement position. The placement height and the separation height are obtained based on the encoder value of the actuator that drives the lift mechanism of the robot 10 and the output of the sensor S (see, e.g., FIG. 2).

Then, the detection unit 21*b* outputs the detected separation height to the calculation unit 21*c*. The calculation unit 21*c* calculates the deflection amount of the substrate 500 based on the difference between the placement height and the separation height. Since the details of the calculation process have already been described with reference to FIG. 2, descriptions thereof will be omitted here.

The teaching information 22*a* is information generated in the teaching step of teaching the robot 10 to perform operations, and including "jobs" that define the operations of the robot 10 including the movement locus of the hand 13. The teaching information 22*a* generated by another computer connected by a wired or wireless network may be stored in the storage unit 22.

The placement information 22*b* is information including the placement height of the substrate 500 in each stage of the cassette 200 illustrated in FIG. 1. Further, the placement information 22*b* may also include the placement height of the substrate 500 in the aligner 300 illustrated in FIG. 7 and the placement height of the substrate 500 in the processing apparatus 400. Thus, by calculating the deflection amount of the substrate 500 placed on the aligner 300 or the processing apparatus 400, the calculated deflection amount may be used in subsequent manufacturing processes even when the thickness or flexibility of the substrate 500 changes according to the manufacturing process.

The deflection amount information 22c is information in which the deflection amount of the substrate 500 is associated with each manufacturing process for each substrate 500. Each time the manufacturing process of the substrate 500 progresses and a new deflection amount is calculated, the corresponding deflection amount of the substrate 500 is updated to the latest value by the calculation unit 21c.

Then, the operation control unit 21a adjusts the transfer height in the transfer of the next process based on the deflection amount information up to the previous process. Thus, since the deflection amount is stored as deflection amount information 22c for each manufacturing process for each substrate 500, the stored deflection amount information 22c may be used in subsequent manufacturing processes, and damage to the substrate 500 due to contact may be more reliably prevented.

Next, an example of the deflection information 22c illustrated in FIG. 8 will be described with reference to FIG. 9. FIG. 9 is an explanatory diagram of the deflection amount information 22c. As illustrated in FIG. 9, the deflection amount information 22c is information including items of "substrate identification number," "manufacturing process number," and "deflection amount." The substrate identification number is a number that uniquely identifies each substrate 500 (see, e.g., FIG. 1). The identification number may be an identification symbol including symbols such as alphabets.

The manufacturing process number is a number that uniquely identifies the manufacturing process of the substrate 500. The manufacturing process number may be a manufacturing process symbol similar to the identification number. Further, the deflection amount is a deflection amount obtained in the manufacturing process corresponding to the latest manufacturing process number.

Here, it is assumed that one record is present for each substrate identification number in the deflection amount information 22c. That is, as the manufacturing process number increases (as the manufacturing process progresses) for of a substrate 500 with a specific substrate identification number, the deflection amount of the corresponding record is updated.

For example, the manufacturing process number for the substrate identification number "1" is "5," and the deflection amount is "2." Further, the manufacturing process number for the substrate identification number "11" is "2," and the deflection amount is "4," and the manufacturing process number for the substrate identification number "41" is "1," and the deflection amount is "6." In this way, for each substrate 500, the deflection amount information 22c is updated with the deflection amount in the latest manufacturing process. Further, as the manufacturing process progresses, the deflection amount is updated.

FIG. 9 illustrates a case where the deflection amount decreases as the manufacturing process number increases. This is because the deflection amount tends to become smaller as the thickness of the substrates 500 increases when the stacking of the substrates 500 progresses in each manufacturing process. Depending on the material of the substrate 500 and details of the manufacturing process, the deflection amount may increase as the manufacturing process progresses.

Figure 10:
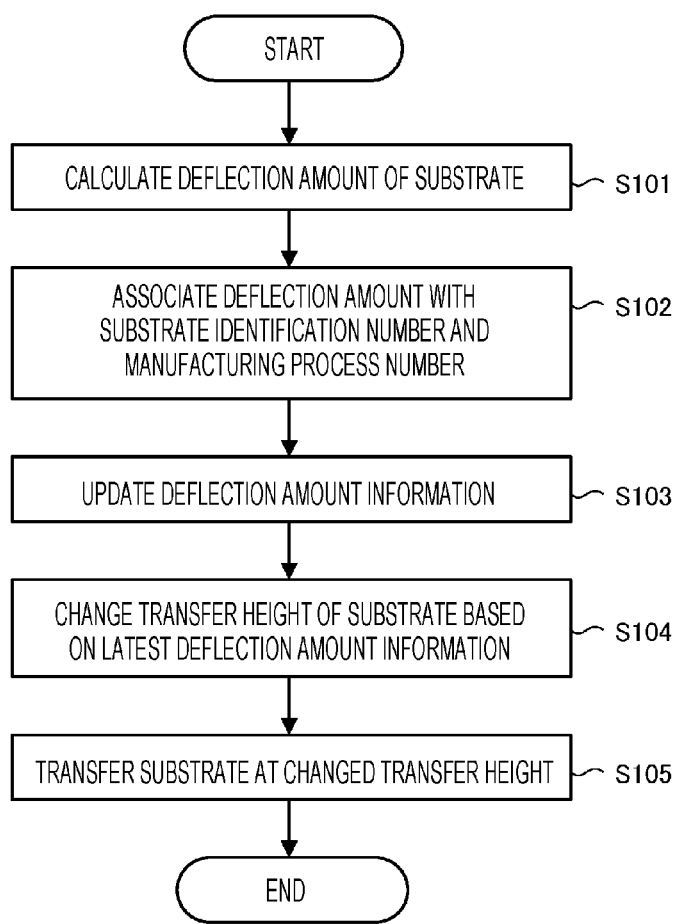
FIG. 10 is a flow chart illustrating the processing procedure of a transfer height adjustment process.

Next, a transfer height adjustment process in each manufacturing process will be described with reference to FIG. 10. FIG. 10 is a flow chart illustrating the processing procedure of the transfer height adjustment process. FIG. 10 illustrates a procedure for adjusting the transfer height in the next manufacturing process when the deflection amount is obtained in an arbitrary manufacturing process.

As illustrated in FIG. 10, the calculation unit 21c of the controller 20 (see, e.g., FIG. 8) calculates the deflection amount of the substrate 500 (see, e.g., FIG. 1) (step S101). Further, the calculation unit 21c associates the deflection amount calculated in step S101 with the substrate identification number and the manufacturing process number (step S102). Then, the calculation unit 21c updates the deflection amount information 22c of the record associated in step S102 (step S103).

Subsequently, in the next manufacturing process, the operation control unit 21a changes the transfer height of the substrate 500 based on the latest deflection amount information 22c (step S104). That is, the operation control unit 21a changes the height of the hand to the transfer height corresponding to the latest deflection amount. Then, the robot 10 transfers the substrate 500 at the changed transfer height (step S105), and ends the process. Steps S101 to S105 are repeated each time the transfer process progresses.

As described above, the transfer system 1 according to an aspect of the embodiment includes a robot 10 and a controller 20 that controls the operation of the robot 10. The robot 10 includes a hand 13 that transfers a substrate 500, and a lift mechanism that moves up and down the hand 13. The hand 13 includes a sensor S capable of detecting a distance to a lower surface of the substrate 500.

Further, the controller 20 includes a storage unit 22, a detection unit 21b, and a calculation unit 21c. The storage unit 22 stores placement information 22b including a placement height at a placement position of the substrate 500. The detection unit 21b detects the separation height at which the substrate 500 is separated from the hand 13 when the hand 13 is moved down from the placement height. The calculation unit 21c calculates a deflection amount of the substrate 500 based on the difference between the placement height and the separation height.

Thus, the separation height of the substrate 500 separated from the hand 13 is detected by moving down the hand 13 from the placement height of the substrate 500, and the deflection amount of the substrate 500 is calculated by the difference between the placement height and the detected separation height, thereby obtaining the deflection amount of the substrate 500. As a result, for example, it is possible to adjust the loading height of a new substrate 500 or to stop loading the new substrate 500, thereby preventing damage to the substrate 500 due to contact even when the substrate 500 is deflected.

According to an aspect of an embodiment, it is possible to provide a transfer system and a transfer method capable of preventing substrates from being damaged due to contact even when the substrates are deflected.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A transfer system comprising:
a robot;
a support on which a substrate is disposed; and
a controller configured to control an operation of the robot,
wherein the robot includes:
a hand configured to transfer the substrate; and
a lift configured to move up and down the hand,
wherein the hand includes:
a sensor configured to detect a distance to a lower surface of the substrate, and
wherein the controller includes:
a storage configured to store placement information including a placement height of the substrate disposed on the support, the placement height indicating a height of an upper surface of the support at a placement position,
a detection circuitry configured to detect a separation height at which the substrate is separated from the hand when the hand is moved down from the placement height, based on a height corresponding to an upper surface of the hand and a detection range of the sensor in a vertical direction, and
a calculation circuitry configured to calculate a deflection amount of the substrate based on a difference between the placement height and the separation height.

2. The transfer system according to claim 1, wherein the robot loads and unloads the substrate to and from a cassette that accommodates a plurality of substrates in multi-stages respectively on a plurality of supports.

3. The transfer system according to claim 2, wherein the substrate is a rectangular panel,
wherein the support includes:
first and second supports each configured to support both ends of the substrate, respectively, when viewed from a front side of the cassette; and
a third support configured to support the substrate at an intermediate position between the first support and the second support when viewed from the front side of the cassette,
wherein the hand includes at least a first extension that is insertable between the first support and the third support, and a second extension that is insertable between the second support and the third support, and
wherein the sensor is provided on each of proximal end sides of the first extension and the second extension.

4. The transfer system according to claim 3, wherein the third support is a bar extending from a rear side of the cassette toward the front side of the cassette, and when viewed from above, a front end of the third support is closer to the rear side of the cassette than front ends of the first support and the second support.

5. The transfer system according to claim 4, wherein when the hand is positioned at a substrate delivery position inside the cassette, the sensor is positioned between the front end of the third support and a front end of the substrate when viewed from above.

6. The transfer system according to claim 3, wherein the detection circuitry detects an orientation of the substrate to be transferred with respect to the hand by causing the sensor provided on each of the proximal end sides of the first extension and the second extension to detect a side of the substrate that is closer to the hand.

7. The transfer system according to claim 2, wherein the robot loads the plurality of substrates into the cassette in an order from the upper stage to the lower stage, and
the controller further includes a determination circuitry configured to determine whether a new substrate is capable of being loaded into an immediately-below stage based on a deflection amount of a substrate last loaded into the cassette.

8. The transfer system according to claim 1, whether the sensor is provided on a proximal end side of the hand.

9. The transfer system according to claim 1, wherein the detection circuitry utilizes the sensor to detect whether the substrate is held by the hand.

10. The transfer system according to claim 1, wherein the robot loads and unloads the substrate to and from an aligner that adjusts the orientation of the substrate, and
the placement information includes a placement height on the aligner.

11. The transfer system according to claim 1, wherein the calculation circuitry stores, in the storage, deflection amount information associated with the deflection amount of the substrate for each manufacturing process for each of the plurality of substrates, and
the robot adjusts a transfer height in a subsequent process based on the deflection amount.

12. A transfer method comprising:
providing a transfer system including a robot, a support on which a substrate is disposed, and a controller that controls an operation of the robot, the robot including a hand that transfers the substrate and a lift that moves up and down the hand, and the hand including a sensor that detects a distance to a lower surface of the substrate;
storing placement information including a placement height of the substrate disposed on the support, the placement height indicating a height of an upper surface of the support at a placement position;
detecting a separation height at which the substrate is separated from the hand when the hand is moved down from the placement height, based on a height corresponding to an upper surface of the hand and a detection range of the sensor in a vertical direction; and
calculating a deflection amount of the substrate based on a difference between the placement height and the separation height.

13. The transfer system according to claim 1, wherein the sensor is a limited reflection type fiber sensor that has a detection range limited to an upward direction.

14. The transfer system according to claim 3, wherein, in a case where a deflection amount at a portion of the substrate supported by the first extension is a first deflection amount, and a deflection amount at a portion of the substrate supported by the second extension is a second deflection amount and is greater than the first deflection amount, the calculation circuitry is configured to select the second deflection amount as the deflection amount.

* * * * *